(12) United States Patent
Eimori et al.

(10) Patent No.: US 7,624,639 B2
(45) Date of Patent: Dec. 1, 2009

(54) ACCELERATION SENSOR

(75) Inventors: Takeshi Eimori, Tonami (JP); Jun Tabota, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/266,575

(22) Filed: Nov. 7, 2008

(65) Prior Publication Data

US 2009/0056450 A1 Mar. 5, 2009

Related U.S. Application Data

(63) Continuation of application No. PCT/JP2007/054934, filed on Mar. 13, 2007.

(30) Foreign Application Priority Data

May 15, 2006 (JP) ............... 2006-134608

(51) Int. Cl.
*G01P 15/09* (2006.01)
(52) U.S. Cl. ............... 73/514.34; 73/514.16; 73/514.29
(58) Field of Classification Search ............. 73/514.34, 73/514.16, 514.29, 514.33; 310/311, 329, 310/331; 29/25.35
See application file for complete search history.

(56) References Cited

U.S. PATENT DOCUMENTS 5,734,107 A * 3/1998 Boehm et al. ............ 73/514.34

6,500,715 B2 * 12/2002 Matsuzaki et al. .......... 438/275
7,168,321 B2 * 1/2007 Terada et al. ............. 73/514.34
2003/0217598 A1 * 11/2003 Tabota ..................... 73/514.34

FOREIGN PATENT DOCUMENTS

JP 01-232267 A 9/1989
JP 2005-164505 A 6/2005

OTHER PUBLICATIONS

Official Communication issued in International Patent Application No. PCT/JP2007/054934, mailed on Jun. 19, 2007.

* cited by examiner

*Primary Examiner*—Hezron Williams
*Assistant Examiner*—Samir M Shah
(74) *Attorney, Agent, or Firm*—Keating & Bennett, LLP (57) ABSTRACT

An acceleration sensor includes a detection element having a plurality of piezoelectric ceramic layers laminated together and a pair of retaining members that retain an end portion of the detection element in a longitudinal direction thereof at two principal surfaces of the end portion. The detection element includes electrodes between the ceramic layers and on principal surfaces. The detection element obtains a voltage or a charge generated in the detection element in response to an application of acceleration from the principal-surface electrodes and the interlayer electrodes. The piezoelectric ceramic layers are not polarized in areas between the principal-surface electrodes and the interlayer electrodes within a retaining area in which the detection element is retained by the retaining members.

5 Claims, 4 Drawing Sheets

ACCELERATION SENSOR

BACKGROUND OF THE INVENTION

1. Field of the Invention

The present invention relates to an acceleration sensor using piezoelectric ceramics.

2. Description of the Related Art

Various acceleration sensors using piezoelectric ceramics have been suggested. An example of such an acceleration sensor includes a detection element having a plurality of piezoelectric ceramic layers laminated together and a pair of retaining members that retain an end portion of the detection element in a longitudinal direction thereof at two principal surfaces of the end portion. This acceleration sensor generates a large amount of energy, which can be expressed as ½ of the product of charge sensitivity and voltage sensitivity, and functions as a high S/N ratio sensor, that is, a high sensitivity sensor.

Figure 6:
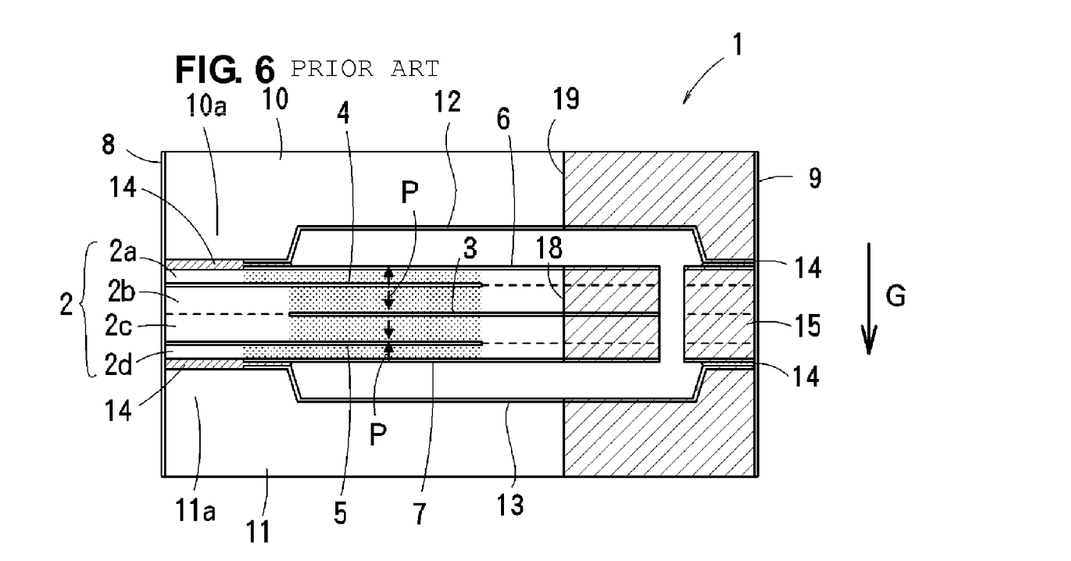
FIG. 6 is a front view showing an example of a known acceleration sensor.

FIG. 6 shows an example of an acceleration sensor disclosed in Japanese Unexamined Patent Application Publication No. 2003-337140 and Japanese Unexamined Patent Application Publication No. 2005-164505. The acceleration sensor 1 includes a detection element 2 and a pair of retaining members 10 and 11 that retain an end portion of the detection element 2 in a longitudinal direction thereof at two principal surfaces of the end portion. The detection element 2 is obtained by integrally firing a laminate of four piezoelectric ceramic layers 2a to 2d. The first layer 2a, the second layer 2b, the third layer 2c, and the fourth layer 2d are arranged in that order from one of the principal surfaces of the detection element 2 to the other one of the principal surfaces. An interlayer electrode 3 is provided at the approximate center of the detection element 2 in the thickness direction thereof, that is, between the second layer 2b and the third layer 2c. In addition, interlayer electrodes 4 and 5 are provided between the first layer 2a and the second layer 2b and between the third layer 2c and the fourth layer 2d, respectively. The detection element 2 includes principal-surface electrodes 6 and 7 on the principal surfaces thereof.

The first layer 2a and the fourth layer 2d of the piezoelectric ceramic layers have substantially the same thickness, and the second layer 2b and the third layer 2c of the piezoelectric ceramic layers have substantially the same thickness. The thickness of the second layer 2b and the third layer 2c is greater than the thickness of the first layer 2a and the fourth layer 2d. As shown by the arrows P in FIG. 6, the piezoelectric ceramic layers 2a to 2d are polarized in the thickness direction. The second layer 2b and the third layer 2c are polarized in the same direction, the first layer 2a and the second layer 2b are polarized in opposite directions, and the fourth layer 2d and the third layer 2c are polarized in opposite directions.

The end portion of the detection element 2 is retained by retaining portions 10a and 11a of the retaining members 10 and 11, respectively. Each of the interlayer electrodes 4 and 5 extends to an end surface of the end portion at one end thereof, and is electrically connected to an external electrode 8 provided continuously on end surfaces of the retaining members 10 and 11 and the end surface of the detection element 2. Each of the interlayer electrodes 4 and 5 extends to a location spaced part from a free end of the detection element 2 by a predetermined distance at the other end thereof.

The interlayer electrode 3 extends to a location corresponding to inner edges of the retaining portions 10a and 11a of the retaining members 10 and 11 at one end thereof, and to the free end of the detection element 2 at the other end thereof. Each of the principal-surface electrodes 6 and 7 extends to an intermediate location of the portion clamped between the retaining portions 10a and 11a of the retaining members 10 and 11 at one end thereof, and to the free end of the detection element 2 at the other end thereof. Extraction electrodes 12 and 13 are provided on inner surfaces of the retaining portions 10a and 11a, respectively, and are electrically connected to the principal-surface electrodes 6 and 7, respectively, with anisotropic conductive adhesive 14. As mentioned above, each of the principal-surface electrodes 6 and 7 extends to an intermediate location of the retaining portions 10a and 11a of the retaining members 10 and 11 at one end thereof. The reason for this is to provide sufficient opposing areas between the principal-surface electrodes 6 and 7 and the extraction electrodes 12 and 13 provided on the inner surfaces of the retaining portions 10a and 11a, respectively, thereby increasing the connection areas. The extraction electrodes 12 and 13 and the principal-surface electrodes 6 and 7 are not conductively connected to the external electrode 8. The extraction electrodes 12 and 13 extend continuously from the inner surfaces of the retaining portions 10a and 11a to inner surfaces of portions of the retaining members 10 and 11 at an end opposed to the retaining portions 10a and 11a. The extraction electrodes 12 and 13 are electrically connected to an external electrode 9 provided on end surfaces of the retaining members 10 and 11 and an end surface of an end member 15 at the end opposite to the retaining portions 10a and 11a.

The detection element 2 includes a connection electrode 18 formed by vapor deposition or sputtering on a side surface at the free end thereof. The connection electrode 18 connects the interlayer electrode 3 and the principal-surface electrodes 6 and 7 to one another. The connection electrode 18 is provided in an area in which the interlayer electrodes 4 and 5 do not extend, and therefore is not connected to the interlayer electrodes 4 and 5. Instead of providing the connection electrode 18 on the side surface of the detection element 2, the connection electrode 18 may also be provided on an end surface of the detection element 2 at the free end thereof. When the connection electrode 18 is provided, an electrode 19 is also provided on side surfaces of the retaining members 10 and 11 and the end member 15. However, the electrode 19 may also be omitted.

Figure 7:
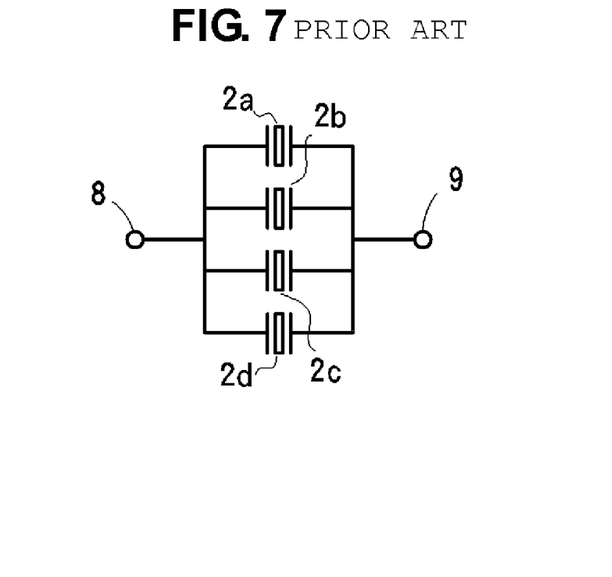
FIG. 7 is a circuit diagram of the acceleration sensor shown in FIG. 6.

As described above, the interlayer electrodes 4 and 5 are connected to the external electrode 8. In addition, the interlayer electrode 3 and the principal-surface electrodes 6 and 7 are connected to one another via the connection electrode 18, and are also connected to the external electrode 9 via the extraction electrodes 12 and 13 provided on the inner surfaces of the retaining members 10 and 11, respectively. Thus, as shown in FIG. 7, the four piezoelectric ceramic layers 2a to 2d are electrically connected in parallel between the external electrodes 8 and 9.

Referring to FIG. 6, when an acceleration G is applied in the direction shown by the arrow, the detection element 2 is deflected by inertia in a direction opposite to the direction in which the acceleration is applied. Accordingly, a compressive stress is applied to an upper half of the detection element 2 and a tensile stress is applied to a lower half of the detection element 2. Therefore, positive charges are generated in the interlayer electrode 3 and the principal-surface electrodes 6 and 7, and negative charges are generated in the interlayer electrodes 4 and 5. As a result, the negative charges are obtained from the external electrode 8 that is conductively connected to the interlayer electrodes 4 and 5, and the positive charges are obtained from the external electrode 9 that is conductively connected to the interlayer electrode 3 and the principal-surface electrodes 6 and 7.

Figure 8:
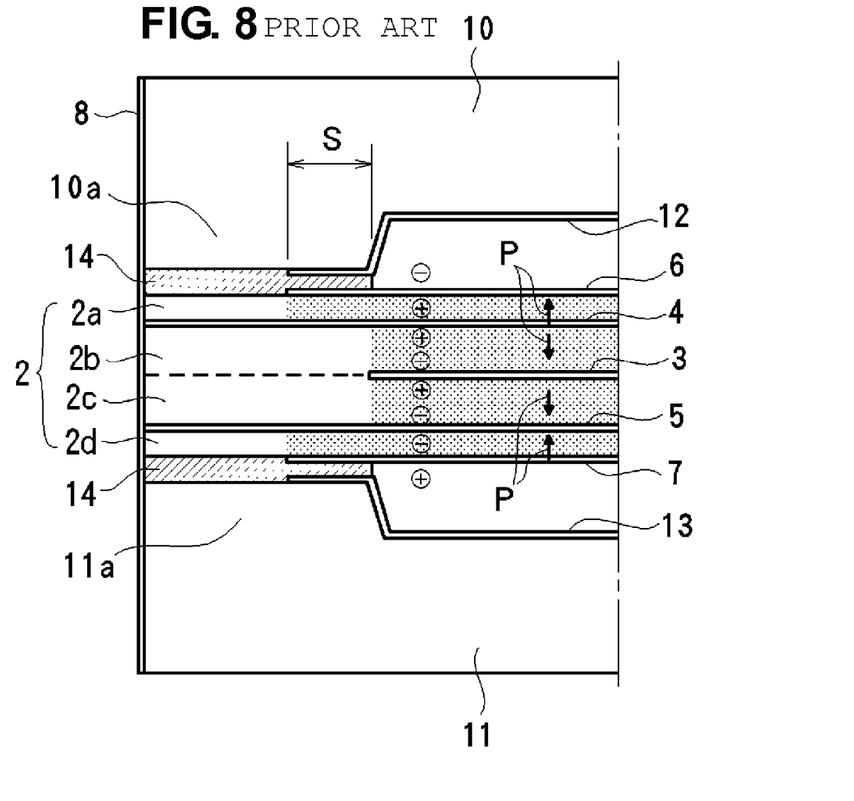
FIG. 8 illustrates charges generated by the pyroelectric effect in the acceleration sensor shown in FIG. 6.

In the acceleration sensor having the above-described structure, when a temperature change is externally applied, heat is transmitted to the detection element 2 through the retaining members 10 and 11. Accordingly, charges shown by the positive and negative signs in FIG. 8 are generated in the piezoelectric ceramic layers 2a to 2d by the pyroelectric effect. If the temperature change is evenly applied to the piezoelectric ceramic layers 2a to 2d, the charges generated by the pyroelectric effect cancel each other between the first layer 2a and the fourth layer 2d and between the second layer 2b and the third layer 2c. Therefore, no output is obtained. However, if the temperature is increased locally, different temperature changes occur in the piezoelectric ceramic layers 2a to 2d. Therefore, the charges generated by the pyroelectric effect do not cancel each other out between the first layer 2a and the fourth layer 2d or between the second layer 2b and the third layer 2c. As a result, an unwanted output (thermal fluctuation noise) is output from the acceleration sensor 1. For example, if the temperature of the retaining member 10 is greater than that of the retaining member 11, heat is transmitted from the retaining portion 10a of the retaining member 10 to the upper surface of the end portion of the detection element 2. Therefore, a temperature difference is generated between the upper surface and the lower surface of the detection element 2, and an unwanted output is generated by the pyroelectric effect.

The cause of the generation of the unwanted output by the pyroelectric effect will be described in more detail. The piezoelectric ceramic layers 2a to 2d included in the detection element 2 are polarized in the directions shown by the arrows P. As shown by the knurling pattern in FIG. 8, polarized areas of the piezoelectric ceramic layers 2a to 2d correspond to areas of the piezoelectric ceramic layers between the electrodes facing one another. This is because the interlayer electrodes 3, 4, and 5 and the principal-surface electrodes 6 and 7 are also used as polarizing electrodes. In this structure, pyroelectric charges are generated in polarized areas (denoted by S in FIG. 8) of the first layer 2a and the fourth layer 2d within a retaining area where the end portion is retained by the retaining members 10 and 11. This is because no pyroelectric charge is generated in non-polarized areas or in areas between electrodes having the same potential. More specifically, portions of the principal-surface electrodes 6 and 7 extend into the areas where the portions of the principal-surface electrodes 6 and 7 face the retaining portions 10a and 11a of the retaining members 10 and 11, respectively. Therefore, pyroelectric charges are generated in the areas S between the extending portions of the principal-surface electrodes 6 and 7 and the interlayer electrodes 4 and 5, and are extracted as an unwanted output.

SUMMARY OF THE INVENTION

To overcome the problems described above, preferred embodiments of the present invention provide an acceleration sensor that reduces an unwanted output generated by the pyroelectric effect in a retaining area of retaining members.

An acceleration sensor according to a preferred embodiment of the present invention includes a detection element and retaining members retaining an end portion of the detection element in a longitudinal direction thereof at two principal surfaces of the end portion, the detection element having a plurality of piezoelectric ceramic layers laminated together. The detection element includes at least one interlayer electrodes interposed between the piezoelectric ceramic layers and principal-surface electrodes on the principal surfaces. The acceleration sensor obtains a voltage or a charge from the principal-surface electrodes and the interlayer electrode, the voltage or the charge being generated in the detection element in response to an application of acceleration. The principal-surface electrodes and the interlayer electrode that is not electrically connected to the principal-surface electrodes extend into a retaining area in which the detection element is retained by the retaining members. The retaining members include extraction electrodes on inner surfaces thereof. At least a portion of each principal-surface electrode extending into the retaining area of the retaining members and at least a portion of the extraction electrode on the inner surface of the corresponding retaining member face each other and are electrically connected to each other. Within the retaining area in which the detection element is retained by the retaining members, the piezoelectric ceramic layers are not polarized in areas between the principal-surface electrodes and the interlayer electrode that is not electrically connected to the principal-surface electrodes.

In the acceleration sensor according to this preferred embodiment of the present invention, when, for example, the temperature of one of the retaining members becomes greater than the other one of the retaining members, heat is transmitted from a retaining portion of one of the retaining members to the upper surface of the end portion of the detection element. Therefore, a temperature difference occurs between the upper surface and the lower surface of the detection element, and there is a risk that an unwanted output will be generated by the pyroelectric effect. However, in preferred embodiments of the present invention, within the retaining area in which the detection element is retained by the retaining members, the piezoelectric ceramic layers are not polarized in areas between the principal-surface electrodes and the interlayer electrode that is not electrically connected to the principal-surface electrodes. Therefore, no pyroelectric charge is generated and no unwanted output is obtained from the portion retained by the retaining members.

There is a possibility that heat applied to the end portion of the detection element will be transmitted to an acceleration detecting portion (portion that is not retained by the retaining members) of the detection element and cause thermal fluctuation noise. However, since the acceleration detecting portion of the detection element is exposed, the temperature change occurs substantially evenly between the ceramic layers, and the generated pyroelectric charges will be canceled.

In a preferred embodiment of the present invention, the detection element includes first to fourth piezoelectric ceramic layers in order from one principal surface to the other principal surface. The interlayer electrode at the approximate center of the detection element in the thickness direction thereof is electrically connected to both of the principal-surface electrodes, and at least one of the principal-surface electrodes extends to a location spaced apart from an end surface on the end portion retained by the retaining members. The at least one of the principal-surface electrodes is electrically connected, with anisotropic conductive adhesive, to the corresponding extraction electrode that is provided on the inner surface of the retaining member and that faces the at least one of the principal-surface electrodes. The interlayer electrode between the first and second piezoelectric ceramic layers of the detection element and the interlayer electrode between the third and fourth piezoelectric ceramic layers of the detection element are electrically connected to each other and extend to the end surface of the end portion retained by the retaining member. In this case, the detection element has a four-layer laminate structure including four piezoelectric ceramic layers that are connected in parallel to extract the charge generated in each layer in response to the application of acceleration. Since the voltage or the charge generated in response to the application of acceleration can be reliably extracted to different portions of the retaining member, the acceleration sensor can be easily configured as a surface-mount device. In addition, at least one of the principal-surface electrodes on the detection element is conductively connected to the extraction electrode on the corresponding retaining member with the anisotropic conductive adhesive. Therefore, even when the distance from the principal-surface electrodes or the extraction electrodes to the end surfaces of the retaining members is relatively small, insulation from one of the external electrodes is ensured. Therefore, the size of the acceleration sensor can be reduced.

In another preferred embodiment of the present invention, the first and fourth piezoelectric ceramic layers of the detection element have substantially the same thickness, the second and third piezoelectric ceramic layers of the detection element have substantially the same thickness, and the thickness of the second piezoelectric ceramic layer is greater than the thickness of the first piezoelectric ceramic layer. By setting the thickness of the two inner layers greater than that of the two outer layers and making the potentials generated in the layers substantially equal to one another, increased energy can be generated.

In another preferred embodiment of the present invention, the detection element includes first and second piezoelectric ceramic layers in order from one principal surface to the other principal surface. Both of the principal-surface electrodes of the detection element extend to a location spaced apart from an end surface on the end portion retained by the retaining members. The principal-surface electrodes are electrically connected, with anisotropic conductive adhesive, to the corresponding extraction electrodes that are provided on the inner surfaces of the retaining members that face the principal-surface electrodes. The interlayer electrode of the detection element extends to the end surface of the end portion retained by the retaining members. This acceleration sensor has a two-layer structure, and the structure thereof is simplified. The two piezoelectric ceramic layers are connected in parallel.

In another preferred embodiment of the present invention, portions of the principal-surface electrodes in the retaining area of the retaining members are not provided at the time when the piezoelectric ceramic layers are polarized but are arranged so as to be electrically connected to portions of the principal-surface electrodes outside the retaining area of the retaining members after the piezoelectric ceramic layers are polarized using the portions of the principal-surface electrodes outside the retaining area of the retaining members. In this case, the end portion of the detection element retained by the retaining members can be easily maintained in a non-polarized state. In addition, the principal-surface electrodes can be easily electrically connected to the extraction electrodes on the inner surfaces of the retaining members.

According to preferred embodiments of the present invention, within the retaining area in which the detection element is retained by the retaining members, the piezoelectric ceramic layers are not polarized in areas between the principal-surface electrodes and the interlayer electrodes that are not electrically connected to the principal-surface electrodes. Therefore, no pyroelectric charge is generated by a temperature change and no unwanted output is obtained from the portion retained by the retaining members.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below with reference to the drawings.

First Preferred Embodiment

Figure 1:
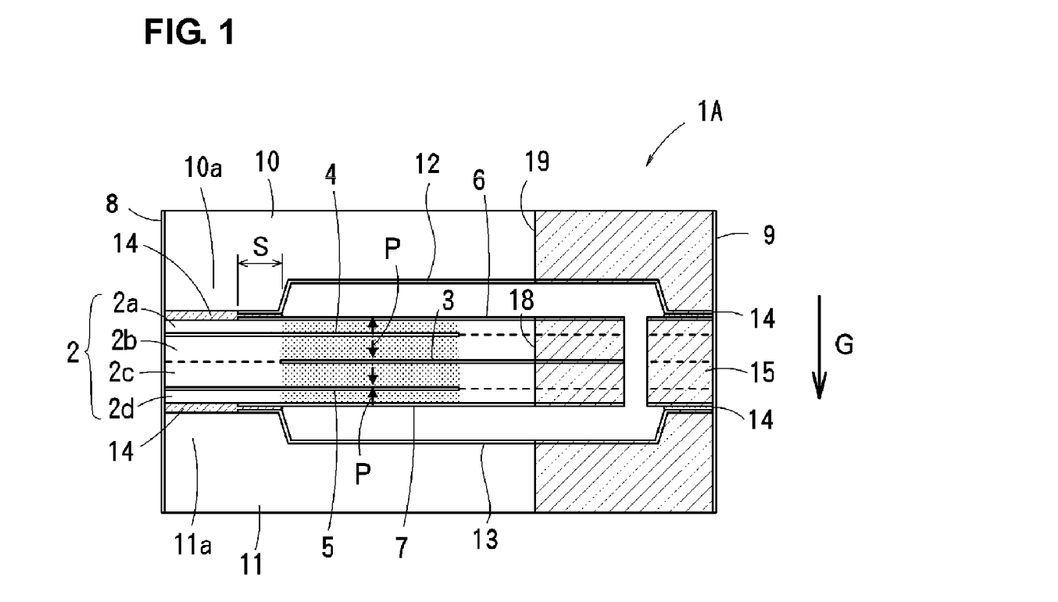
FIG. 1 is a front view of an acceleration sensor according to a first preferred embodiment of the present invention.
Figure 2:
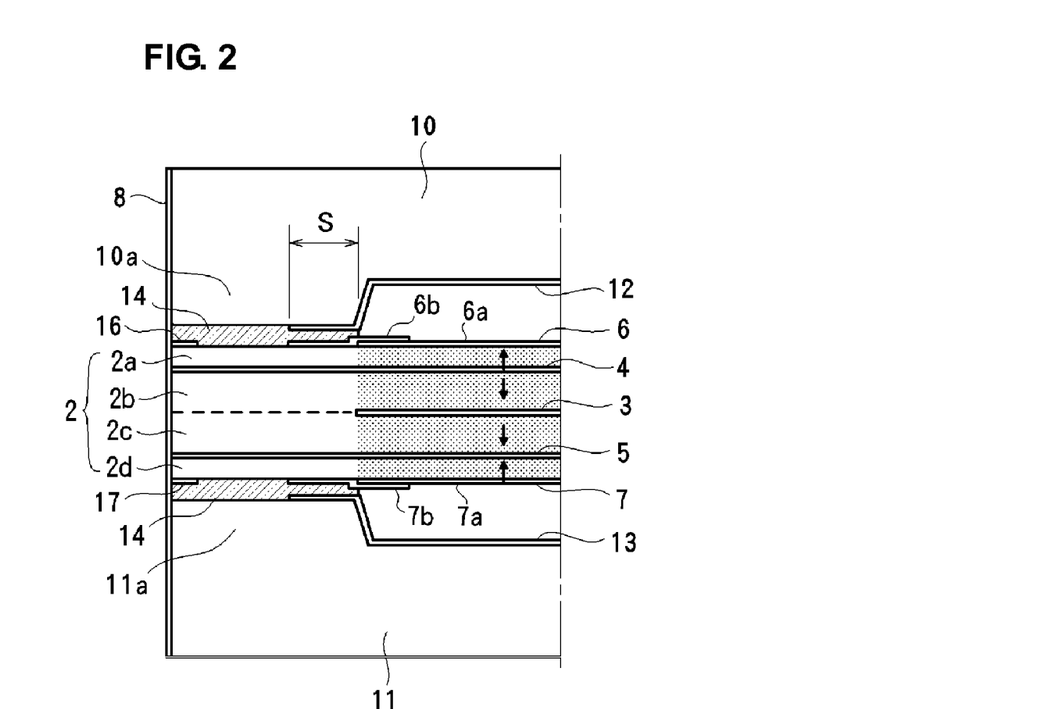
FIG. 2 is an enlarged view of a portion of the acceleration sensor shown in FIG. 1.

FIGS. 1 and 2 show an acceleration sensor according to a first preferred embodiment of the present invention. The basic structure of this acceleration sensor 1A is similar to the known acceleration sensor 1 shown in FIG. 6. Therefore, components similar to those shown in FIG. 6 are denoted by the same reference numerals and redundant descriptions thereof are omitted.

In the acceleration sensor 1A according to the first preferred embodiment of the present invention, within a retaining area in which a detection element 2 is retained by retaining members 10 and 11, piezoelectric ceramic layers 2a to 2d are not polarized in areas (denoted by S in FIGS. 1 and 2) between electrodes that face each other across the piezoelectric ceramic layers 2a to 2d and are not connected to each other. In other words, as shown by the knurling pattern in FIG. 1, the piezoelectric ceramic layers are polarized only in the areas between the electrodes 3 to 7 with different potentials and outside the retaining area in which the detection element 2 is retained by the retaining members 10 and 11. Therefore, the first layer 2a is not polarized in the retaining area of the retaining members 10 and 11, and the fourth layer 2d is not polarized in the retaining area of the retaining members 10 and 11.

The second layer 2b and the third layer 2c may be polarized in the retaining area of the retaining members 10 and 11 because interlayer electrodes 4 and 5 are connected to each other by an external electrode 8. In addition, it is not necessary that the first layer 2a and the fourth layer 2d be non-polarized in the entire retaining area of the retaining members 10 and 11. For example, electrodes 16 and 17 (see FIG. 2) connected to the interlayer electrodes 4 and 5 may preferably be provided on the outer surfaces of the first layer 2a and the fourth layer 2d, respectively. In such an arrangement, within the retaining area of the retaining members 10 and 11, the first layer 2a and the fourth layer 2d may be polarized in areas between the electrodes 16 and 17 and the interlayer electrodes 4 and 5.

To keep the first layer 2a and the fourth layer 2d non-polarized in the retaining area of the retaining members 10 and 11, as shown in FIG. 2, the principal-surface electrodes 6 and 7 are respectively defined by detection electrodes 6a and 7a and extraction electrodes 6b and 7b. The detection electrode 6a is used to polarize the first layer 2a located between the detection electrode 6a and the interlayer electrode 4. After the first layer 2a is polarized, the extraction electrode 6b is arranged so as to overlap the detection electrode 6a. Similarly, the detection electrode 7a is used to polarize the fourth layer 2d located between the detection electrode 7a and the interlayer electrode 5. After the fourth layer 2d is polarized, the extraction electrode 7b is arranged so as to overlap the detection electrode 7a.

The method for keeping the first layer 2a and the fourth layer 2d non-polarized in the retaining area of the retaining members 10 and 11 is not limited to the method shown in FIG. 2. For example, the detection electrodes 6a and 7a may preferably be provided separately from the extraction electrodes in advance. Then, after the polarization process using the detection electrodes 6a and 7a, connection electrodes may be arranged to connect the extraction electrodes to the corresponding detection electrodes 6a and 7a.

When a temperature change is applied to the acceleration sensor 1A, the temperature change is transmitted to the detection element 2 through the retaining members 10 and 11. However, no charge is generated by the pyroelectric effect because the piezoelectric ceramic layers 2a and 2d are not polarized in the retaining area of the retaining members 10 and 11. An acceleration detecting portion of the detection element 2 is not retained by the retaining members 10 and 11. In the acceleration detecting portion, charges generated by the pyroelectric effect are canceled between the first layer 2a and the fourth layer 2d and between the second layer 2b and third layer 2c irrespective of whether or not the temperature change is evenly applied to the acceleration sensor 1A, because the temperature change is applied evenly between the ceramic layers. As a result, no unwanted output is generated from the portion clamped between the retaining members 10 and 11 and the thermal fluctuation noise can be greatly reduced.

As another method of reducing the thermal fluctuation noise, the polarized areas of the detection element 2 may preferably be shifted toward the free end of the detection element 2 instead of eliminating the polarized areas of the detection element 2 from the retaining area of the retaining members 10 and 11. However, in this case, the sensitivity is greatly reduced. If the polarized areas are eliminated only in the retaining area of the retaining members 10 and 11 as in the present preferred embodiment of the present invention, the same sensitivity as that of the known structure shown in FIG. 6 can be obtained. In other words, according to the present preferred embodiment, the thermal fluctuation noise can be greatly reduced without reducing the sensitivity as compared to that of the known structure.

Figure 3:
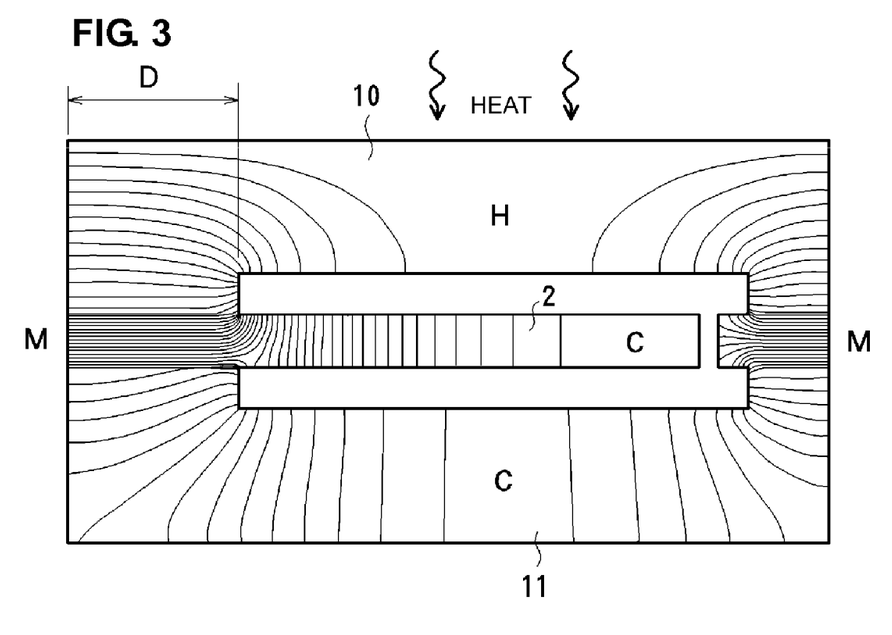
FIG. 3 is a temperature distribution diagram obtained when a temperature change is applied to the acceleration sensor shown in FIG. 1.

FIG. 3 illustrates a temperature distribution in the acceleration sensor 1A shown in FIG. 1. More specifically, FIG. 3 shows the results of a finite element method (FEM) analysis of the temperature distribution in the acceleration sensor 1A obtained when the temperature of the acceleration sensor 1A is maintained at about 25° C., for example, and then the acceleration sensor 1A is heated from above in the figure at about 50° C., for example, for about one second. Here, it is assumed that the size of the acceleration sensor 1A is about 2.0 mm×about 3.8 mm (thickness of the detection element is about 0.27 mm), the length of the retaining portions D is about 0.8 mm, and the length of the principal-surface electrodes 6 and 7 in the retaining area of the retaining members 10 and 11 S is about 0.4 mm. In FIG. 3, H denotes a high-temperature area (about 50° C., for example), C denotes a low-temperature area (about 25° C., for example), and M denotes an intermediate temperature area (about 37° C., for example).

Figure 4:
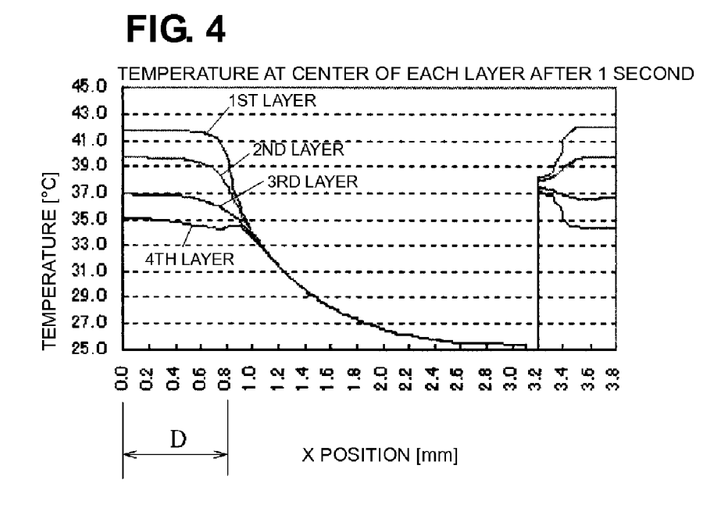
FIG. 4 shows a temperature distribution at the approximate center of each piezoelectric ceramic layer when a temperature change is applied under the same conditions as those in FIG. 3.

FIG. 4 shows the temperature distribution in each of the piezoelectric ceramic layers 2a to 2d at the approximate center thereof in the thickness direction. The temperature distribution shown in FIG. 4 is obtained under substantially the same heating condition as those of FIG. 3. The retaining area D of the retaining members 10 and 11 preferably corresponds to the range X of about 0 mm to about 0.8 mm, for example. As shown in FIG. 4, the portion of the detection element 2 that is not retained by the retaining members 10 and 11 (X>about 0.8 mm) has almost no temperature variation in the thickness direction. Therefore, almost no thermal fluctuation noise is generated from the portion of the detection element 2 that is not retained by the retaining members 10 and 11. The pyroelectric effect is affected by the temperature difference between the first layer 2a and the fourth layer 2d of the detection element 2 in the retaining area of the retaining members 10 and 11. In this example, the temperature of the first layer 2a is about 42° C. and the temperature of the fourth layer 2d is about 35° C.

The table provided below shows a comparison between the thermal fluctuation noise caused in the structure of the present preferred embodiment of the present invention (FIG. 1) and that caused in a comparative example (FIG. 6) on the basis of the temperature distribution shown in FIGS. 3 and 4. As shown in Table 1, because the first layer 2a and the fourth layer 2d are not polarized in the retaining area of the retaining members, the thermal fluctuation noise generated in the structure of the present preferred embodiment is reduced to about half or less of that generated in the comparative example.

TABLE 1

| Present Invention [mGrms] | Comparative Example [mGrms] | Ratio to Comparative Example |
| --- | --- | --- |
| 62.3 | 136.3 | 46% |

Second Preferred Embodiment

Figure 5:
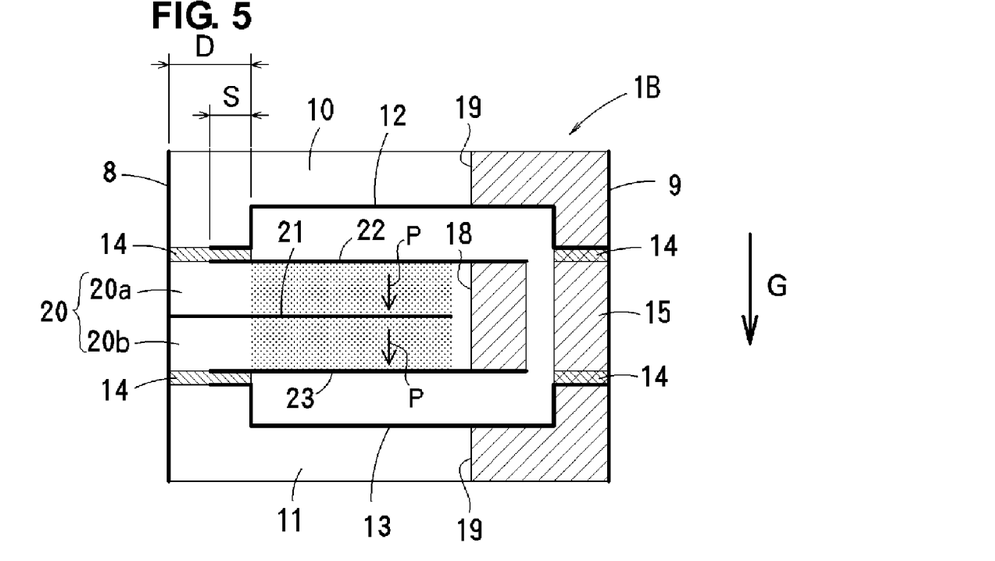
FIG. 5 is a front view of an acceleration sensor according to a second preferred embodiment of the present invention.

FIG. 5 shows an acceleration sensor according to a second preferred embodiment of the present invention. Components similar to those of the first preferred embodiment are denoted by the same reference numerals, and redundant descriptions thereof are omitted. The acceleration sensor 1B according to the present preferred embodiment includes a detection element 20 supported by retaining members 10 and 11 at one end thereof. The detection element 20 is obtained by integrally firing a laminate of two piezoelectric ceramic layers 20a and 20b. An interlayer electrode 21 is provided at the approximate center of the detection element 20 in the thickness direction thereof, and principal-surface electrodes 22 and 23 are provided on upper and lower surfaces, respectively, of the detection element 20. The two piezoelectric ceramic layers 20a and 20b are polarized in the same direction along the thickness thereof, as shown by the arrows P.

The interlayer electrode 21 extends from an end of the detection element 20 in which an external electrode 8 is provided to an intermediate location of the detection element 20. In other words, an electrode gap is provided at a free end of the detection element 20. The principal-surface electrodes 22 and 23 extend from an end portion of the detection element 20 that is retained by the retaining members 10 and 11 to the free end thereof. The principal-surface electrodes 22 and 23 are electrically connected to extraction electrodes 12 and 13 provided on the retaining members 10 and 11, respectively, with anisotropic conductive adhesive 14. The detection element 20 includes a connection electrode 18 provided on a side surface at the free end thereof. The connection electrode 18 connects the principal-surface electrodes 22 and 23 to each other. However, the connection electrode 18 is not conductively connected to the interlayer electrode 21. The piezoelectric ceramic layers 20a and 20b are electrically connected in parallel.

In this acceleration sensor 1B, as shown by the knurling pattern in FIG. 5, the piezoelectric ceramic layers 20a and 20b are polarized only in areas between the electrodes 21 and 22 and between the electrodes 21 and 23 and outside the retaining area in which the detection element 20 is retained by the retaining members 10 and 11. In other words, within the retaining area D in which the detection element 20 is retained by the retaining members 10 and 11, the piezoelectric ceramic layers 20a and 20b are not polarized in areas (denoted by S in FIG. 5) between the electrodes 21 and 22 facing each other across the piezoelectric ceramic layer 20a without electrical connection and between the electrodes 21 and 23 facing each other across the piezoelectric ceramic layer 20b without electrical connection. Therefore, no charge is generated by the pyroelectric effect and the thermal fluctuation noise can be greatly reduced.

The present invention is not limited to the above-described preferred embodiments. The structure of the piezoelectric ceramic layers defining the detection element is not limited to the four-layer structure or the two-layer structure, and may also be other multilayer structures, such as a six-layer structure and an eight-layer structure, for example. In addition, the piezoelectric ceramic layers defining the detection element may be subjected to firing in an integral state, or may be laminated together after firing.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An acceleration sensor comprising:
   a detection element; and
   retaining members retaining an end portion of the detection element in a longitudinal direction thereof at two principal surfaces of the end portion, the detection element including a plurality of piezoelectric ceramic layers laminated together; wherein
   the detection element includes at least one interlayer electrode interposed between the plurality of piezoelectric ceramic layers and principal-surface electrodes disposed on the principal surfaces;
   the acceleration sensor obtains at least one of a voltage and a charge from the principal-surface electrodes and the interlayer electrode, the at least one of the voltage and the charge being generated in the detection element in response to an application of acceleration;
   the principal-surface electrodes and the interlayer electrode that is not electrically connected to the principal-surface electrodes extend into a retaining area in which the detection element is retained by the retaining members;
   the retaining members include extraction electrodes on inner surfaces thereof;
   at least a portion of each principal-surface electrode extending into the retaining area of the retaining members and at least a portion of the extraction electrode on the inner surface of the corresponding retaining member face each other and are electrically connected to each other; and
   within the retaining area in which the detection element is retained by the retaining members, the piezoelectric ceramic layers are not polarized in areas between the principal-surface electrodes and the interlayer electrode that is not electrically connected to the principal-surface electrodes.

2. The acceleration sensor according to claim 1, wherein
   the detection element includes first, second, third, and fourth piezoelectric ceramic layers in order from one principal surface to the other principal surface;
   the interlayer electrode at an approximate center of the detection element in a thickness direction thereof is electrically connected to both of the principal-surface electrodes, and at least one of the principal-surface electrodes extends to a location spaced apart from an end surface on the end portion retained by the retaining members;
   the at least one of the principal-surface electrodes is electrically connected, with anisotropic conductive adhesive, to the corresponding extraction electrode that is provided on at least one of the inner surfaces of the retaining member and that faces the at least one of the principal-surface electrodes; and
   the interlayer electrode between the first and second piezoelectric ceramic layers of the detection element and the interlayer electrode between the third and fourth piezoelectric ceramic layers of the detection element are electrically connected to each other and extend to an end surface of the end portion retained by the retaining member.

3. The acceleration sensor according to claim 2, wherein the first and fourth piezoelectric ceramic layers of the detection element have substantially the same thickness, the second and third piezoelectric ceramic layers of the detection element have substantially the same thickness, and the thickness of the second piezoelectric ceramic layer is greater than the thickness of the first piezoelectric ceramic layer.

4. The acceleration sensor according to claim 1, wherein
   the detection element includes first and second piezoelectric ceramic layers in order from one principal surface to the other principal surface;
   both of the principal-surface electrodes of the detection element extend to a location spaced apart from an end surface on the end portion retained by the retaining members;
   the principal-surface electrodes are electrically connected, with anisotropic conductive adhesive, to the corresponding extraction electrodes that are provided on the inner surfaces of the retaining members that face the principal-surface electrodes; and
   the interlayer electrode of the detection element extends to the end surface of the end portion retained by the retaining members.

5. The acceleration sensor according to claim 1, wherein portions of the principal-surface electrodes in the retaining area of the retaining members are not provided at a time when the piezoelectric ceramic layers are polarized but are arranged so as to be electrically connected to portions of the principal-surface electrodes outside the retaining area of the retaining members after the piezoelectric ceramic layers are polarized using the portions of the principal-surface electrodes outside the retaining area of the retaining members.

* * * * *